United States Patent
Aotani

(10) Patent No.: US 8,003,276 B2
(45) Date of Patent: Aug. 23, 2011

(54) MEMBRANE ELECTRODE ASSEMBLY AND FUEL CELL USING THE SAME

(75) Inventor: Koichiro Aotani, Yokosuka (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 710 days.

(21) Appl. No.: 12/086,059

(22) PCT Filed: Dec. 7, 2006

(86) PCT No.: PCT/JP2006/324447
§ 371 (c)(1),
(2), (4) Date: Jun. 5, 2008

(87) PCT Pub. No.: WO2007/074616
PCT Pub. Date: Jul. 5, 2007

(65) Prior Publication Data
US 2009/0053577 A1    Feb. 26, 2009

(30) Foreign Application Priority Data

Dec. 27, 2005  (JP) .................................. 2005-376426
Aug. 31, 2006  (JP) .................................. 2006-236454

(51) Int. Cl.
*H01M 8/10* (2006.01)
(52) U.S. Cl. ......... 429/493; 429/483; 429/491; 429/492
(58) Field of Classification Search .................. 429/447, 429/465, 476, 477, 479, 482, 483, 491, 492, 429/493
See application file for complete search history.

(56) References Cited

U.S. PATENT DOCUMENTS

| | | | |
|---|---|---|---|
| 5,607,785 A | | 3/1997 | Tazawa et al. |
| 2002/0001744 A1 | | 1/2002 | Tsusaka et al. |
| 2005/0233183 A1* | | 10/2005 | Hampden-Smith et al. .... 429/12 |

FOREIGN PATENT DOCUMENTS

| | | |
|---|---|---|
| JP | 10-106593 A | 4/1998 |
| JP | 2001-248864 | 9/2001 |
| JP | 2001-319663 A | 11/2001 |
| JP | 2002-203569 A | 7/2002 |
| JP | 2006-172949 A | 6/2006 |

* cited by examiner

*Primary Examiner* — Patrick Ryan
*Assistant Examiner* — Ben Lewis
(74) *Attorney, Agent, or Firm* — Foley & Lardner LLP

(57) ABSTRACT

A membrane electrode assembly for a fuel cell of the present invention includes an electrolyte membrane (100); and a pair of electrode catalyst layers (110) provided on both surfaces of the electrolyte membrane. Furthermore, in the present invention, a plurality of hydrophilic groups exist along a substantially continuous concentration gradient from a surface of one of the electrode catalyst layers opposite to a surface thereof in contact with the electrolyte membrane to a surface of the other electrode catalyst layer opposite to a surface thereof in contact with the electrolyte membrane in a thickness direction of the electrolyte membrane (100) and the electrode catalyst layers (110). This makes it possible to provide a membrane electrode assembly with water management performed not only in the surfaces but also in the entire assembly in the thickness direction.

10 Claims, 6 Drawing Sheets

MEMBRANE ELECTRODE ASSEMBLY AND FUEL CELL USING THE SAME

TECHNICAL FIELD

The present invention relates to a membrane electrode assembly and more specifically to a membrane electrode assembly for a fuel cell with water managed in a thickness direction.

BACKGROUND ART

In recent years, in response to social requirements and movements due to energy and environmental problems, fuel cells capable of operating at room temperature and having high power density have attracted attention as power supplies for electric vehicles and fixed power supplies. A fuel cell, which produces water in the electrode reaction in principle, is a clean power generation system having few adverse effects on the global environment. Fuel cells include polymer electrolyte fuel cells (PEFCs), phosphoric acid fuel cells (PAFCs), alkaline fuel cells (AFCs), solid oxide fuel cells (SOFCs), molten carbonate fuel cells (MCFCs), and the like. The polymer electrolyte fuel cells hold promise as power sources for electric vehicles because the polymer electrolyte fuel cells can operate at comparatively low temperature and have high power density.

A general polymer electrolyte fuel cell has a structure in which a membrane electrode assembly (hereinafter, also just referred to MEA) is sandwiched by separators. The MEA includes a solid electrolyte membrane sandwiched by a pair of electrode catalyst layers and if necessary, by gas diffusion layers.

Each of the electrode catalyst layers is a porous substance made of a mixture of a polymer electrolyte and an electrode catalyst including catalyst particles supported on an electroconductive support. Each of the gas diffusion layers includes a water-repellent carbon layer formed on a surface of a gas diffusion substrate such as carbon cloth. The water-repellent carbon layer is composed of carbon particles, a water repellant, and the like.

In the polymer electrolyte fuel cell, the following electrochemical reaction proceeds. First, hydrogen contained in fuel supplied to the anode-side electrode catalyst layer is oxidized by the electrode catalyst into protons and electrons as shown by the following Formula (1). Next, the generated protons pass through the polymer electrolyte contained in the anode-side electrode catalyst layer and the electrolyte membrane in contact with the anode-side electrode catalyst layer, and reach the cathode-side electrode catalyst layer. The electrons produced in the anode-side electrode catalyst layer pass through the electroconductive support constituting the anode-side electrode catalyst layer, the gas diffusion layer in contact with a surface of the anode-side electrode catalyst layer opposite to the solid electrolyte membrane, a separator, and an external circuit to reach the cathode-side electrode catalyst layer. The protons and electrons having reached the cathode-side electrode catalyst layer react with oxygen contained in oxidant gas supplied to the cathode side through the electrode catalyst, thus producing water. In the fuel cell, electricity can be extracted to the outside by the aforementioned electrochemical reaction.

(Chemical Formula 1)

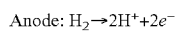

$$\text{Anode: } H_2 \rightarrow 2H^+ + 2e^- \quad (1)$$

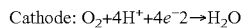

$$\text{Cathode: } O_2 + 4H^+ + 4e^- 2 \rightarrow H_2O \quad (2)$$

The polymer electrolyte contained in the fuel cell does not provide high protonic conductivity when the polymer electrolyte is not wet. It is therefore necessary to humidify the reaction gas supplied to the polymer electrolyte fuel cell using an auxiliary such as a gas humidifier. However, humidifying the fuel cell using such an auxiliary causes complication and enlargement of an entire fuel cell system, reduction in power generation efficiency, and the like.

Japanese Patent Unexamined Publication No. 2002-203569 discloses an electrode catalyst layer with a gas-phase side surface covered with a water-repellent layer having a reaction gas permeability.

DISCLOSURE OF INVENTION

In Japanese Patent Unexamined Publication No. 2002-203569, for water management of the membrane electrode assembly, the gas phase-side surface of the electrode catalyst layer is modified to reduce discharge of produced water. However, this technique does not achieve water management of the entire membrane electrode assembly and does not give full effect.

The present invention was made in the light of the problem of the aforementioned conventional art and an object of the present invention is to provide a membrane electrode assembly with water management implemented not only in the surface but throughout the entire membrane assembly in the thickness direction.

A membrane electrode assembly for a fuel cell according to an aspect of the present invention includes: an electrolyte membrane; and a pair of electrode catalyst layers provided on both surfaces of the electrolyte membrane, wherein, in a thickness direction of the electrolyte membrane and the electrode catalyst layers, a plurality of hydrophilic groups exist along a substantially continuous concentration gradient from a surface of one of the electrode catalyst layers opposite to the surface thereof in contact with the electrolyte membrane to a surface of the other electrode catalyst layer opposite to the surface thereof in contact with the electrolyte membrane.

BEST MODE FOR CARRYING OUT THE INVENTION

Figure 1:
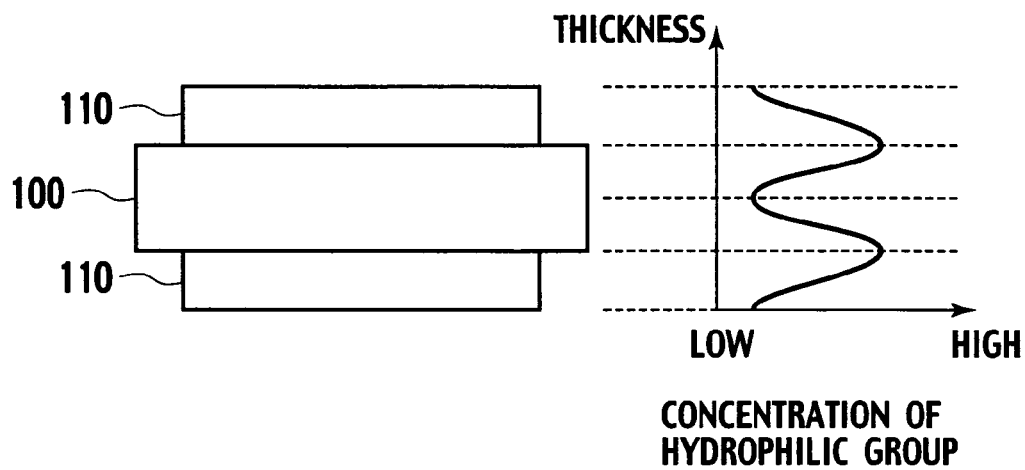
FIG. 1 is a schematic view showing a concentration gradient of hydrophilic groups in a membrane electrode assembly of the present invention.

The present invention is characterized in that a membrane electrode assembly for a fuel cell including electrode catalyst layers provided on both surfaces of an electrolyte membrane (just referred to as a "membrane electrode assembly") includes hydrophilic groups along a concentration gradient in a thickness direction of the membrane electrode assembly.

A polymer electrolyte contained in the membrane electrode assembly does not exhibit high proton conductivity if not wet. In the fuel cell, water produced by the electrode reaction during the operation is used to humidify the polymer electrolyte, and means of humidifying the polymer electrolyte through gas externally supplied to the electrode catalyst layers is used. However, in the membrane electrode assembly, the polymer electrolyte is contained in the electrode catalyst layers and also in an electrolyte membrane. Accordingly, in order to accelerate the electrode reaction in the membrane electrode assembly to obtain high power generation performance, it is necessary to perform water management in the entire membrane electrode assembly containing the polymer electrolyte.

Moreover, in the membrane electrode assembly, protons are conducted by the wet polymer electrolyte between the electrode catalyst layers with the electrolyte membrane interposed therebetween. Together with the protons conducted, water contained in the electrode catalyst layers and electrolyte membrane is transferred. Accordingly, it is desired to perform water management of the entire membrane electrode assembly in the thickness direction of the electrolyte membrane.

The membrane electrode assembly of the present invention has a structure in which hydrophilic groups exist along a concentration gradient in the thickness direction of the membrane electrode assembly. Water generally tends to move from a hydrophobic part to a hydrophilic part. Accordingly, in the membrane electrode assembly of the present invention having the aforementioned structure, the hydrophilic groups allows water to move to a part requiring water, thus enabling water management of the entire membrane electrode assembly.

In the membrane electrode assembly of the present invention, the hydrophilic groups are preferably ion-exchange groups contained in the polymer electrolyte. This allows water management to be carried out without reducing the proton conductivity in the membrane electrode assembly.

The aforementioned ion-exchange groups are cation-exchange groups such as $-SO_3H$, $-OH$, $-PO_4^{3-}$, $-COOH$, $-PO(OH)_2$, $-POH(OH)$, $-SO_2NHSO_2-$, $-Ph(OH)$ (Ph indicates a phenyl group) and anion-exchange groups such as $-NH_2$, $-NHR$, $-NRR'$, $-NRR'R''^+$, and $-NH_3^+$ R, R', and R'' indicate an alkyl group, a cycloalkyl group, and an aryl group). The polymer electrolyte may include one or more types of these ion-exchange groups.

The alkyl group is a methyl group, an ethyl group, a propyl group, an isobutyl group, a sec-butyl group, a pentyl group, an iso-amyl group, a hexyl group, or the like. The cycloalkyl group is a cyclopentyl group, a cyclohexyl group, a cycloheptyl or the like. The aryl group is a phenyl group, a naphthyl group, a tetrahydronaphthyl group, or the like.

The ion-exchange groups are preferably sulfonic acid groups, hydroxyl groups, or phosphoric acid groups because of the high water adsorption capacity thereof.

The membrane electrode assembly of the present invention has a structure in which the above-described hydrophilic groups exist along a concentration gradient in the thickness direction. It is preferable that the concentration gradient of the hydrophilic groups is controlled according to operation conditions of the fuel cell.

For example, in a fuel cell for use in operation conditions of low humidity and low current density, such as in the case where the humidity of gas externally supplied is not more than 30% or where the output current density is not more than 0.2 A/cm$^2$, the humidity of the polymer electrolyte contained in the membrane electrode assembly may be reduced to make it difficult to provide high power generation performance. In such a case, the reduction of the humidity of the polymer electrolyte contained in the membrane electrode assembly affects the surfaces of the electrolyte membrane most. Accordingly, in the fuel cell for use in such operation conditions, it is preferable that the water management in the membrane electrode assembly is performed so that the surfaces of the electrolyte membrane hold a lot of water.

The membrane electrode assembly of the present invention is preferably uses a structure (I) as shown in FIG. 1. In the structure (I), an electrode catalyst layer 110 has an increasing concentration gradient of the hydrophilic groups toward the electrolyte membrane 100 in the thickness direction of the electrode catalyst layer 110. The electrolyte membrane 100 has an increasing concentration gradient of the hydrophilic groups from the center thereof toward the surfaces thereof in contact with the electrode catalyst layers in the thickness direction of the electrolyte membrane 100. The electrolyte membrane 100 and electrode catalyst layers 110 are attached to each other such that the surfaces which have the highest concentration of the hydrophilic groups face each other.

The membrane electrode assembly having the aforementioned structure (I) can hold water in the surfaces of the electrolyte membrane, thus making it possible to prevent dryness in the surfaces of the electrolyte membrane.

In the membrane electrode assembly of the present invention, each of the surfaces of the electrolyte membrane and electrode catalyst layers with high concentration of the hydrophilic groups exhibits high hydrophilicity and has a small water contact angle. On the other hand, the center of the electrolyte membrane and the surfaces of the electrode catalyst layers with low concentration of the hydrophilic groups exhibit low hydrophilicity and have a large water contact angle. In other words, the content of the hydrophilic groups is proportional to the water contact angle, and the concentration of the hydrophilic groups is defined as the water contact angle in the surfaces of the electrolyte membrane and electrode catalyst layers.

In the membrane electrode assembly having the structure (I), the electrolyte membrane has an increasing concentration gradient of the hydrophilic groups from the center part thereof toward the surfaces in contact with the electrode catalyst layers in the thickness direction of the electrolyte membrane.

In the electrolyte membrane, preferably, the difference in water contact angle between the center part of the electrolyte membrane and the surfaces of the electrolyte membrane in contact with the electrode catalyst layers is preferably, not less than 5 degrees and more preferably, not less than 20 degrees. This can accelerate movement of water in the electrolyte membrane.

Each of the surfaces of the electrolyte membrane in contact with the electrode catalyst layer provides high hydrophilicity and has small water contact angles. The water contact angles of the above surfaces of the electrolyte membrane are preferably 5 to 100 degrees and more preferably 5 to 60 degrees. This can prevent the polymer electrolyte from dryness even in the conditions where the polymer electrolyte tends to dry.

The water contact angle of the center part of the electrolyte membrane is preferably 10 to 150 degrees and more preferably 60 to 130 degrees. Herein, the center part of the electrolyte membrane is a part of the electrolyte membrane other than the surfaces of the electrolyte membrane having the aforementioned water contact angle.

In the membrane electrode assembly having the structure (I), each electrode catalyst layer has an increasing concentration gradient of the hydrophilic groups toward the electrolyte membrane in the thickness direction of the electrode catalyst layer.

In the electrode catalyst layer, the difference in water contact angle between the surface opposite to the surface in contact with the electrolyte membrane and the surface in contact with the electrolyte membrane is preferably not less than 5 degrees and more preferably not less than 20 degrees. This can accelerate movement of water in the electrolyte membrane.

The surface of the electrode catalyst layer in contact with the electrolyte membrane provides high hydrophilicity and has a small water contact angle. The water contact angle of the surface of the electrode catalyst layer in contact with the electrolyte membrane is preferably 5 to 100 degrees and more preferably 5 to 60 degrees. This can prevent the polymer electrolyte from dryness even in the conditions where the polymer electrolyte tends to dry.

The surface of the electrode catalyst layer opposite to the surface in contact with the electrolyte membrane is less hydrophilic than the surface in contact with the electrolyte membrane. The water contact angle of the surface of the electrode catalyst layer opposite to the surface in contact with the electrolyte membrane is preferably 10 to 150 degrees and more preferably 60 to 130 degrees. This can prevent the polymer electrolyte from dryness even in the conditions where the polymer electrolyte tends to dry.

In the membrane electrode assembly having the aforementioned structure (I), preferably, at the interface between each electrode catalyst layer and the electrolyte membrane, the electrode catalyst layer and electrolyte membrane have an equal concentration of the hydrophilic groups and have a difference in water contact angle of not more than 5 degrees. This can give an effect on not only accelerating movement of water but also improving matching of the electrode catalyst layers and electrolyte membrane.

In the membrane electrode assembly of the present invention, it is preferable that the concentration gradient of the hydrophilic groups is controlled according to the operation conditions of the fuel cell as described above. For example, in a fuel cell for use in operation conditions of high humidity and high current density, such as in the case where the humidity of gas externally supplied is not less than 60% or where the output current density is not less than 0.6 A/cm$^2$, a lot of water remains in the electrode catalyst layers. Accordingly, flooding, which closes pores in the electrode catalyst layer serving as a reaction gas supply channel, is more likely to occur. This inhibits diffusion of the reaction gas and prevents the electrochemical reaction, thus resulting in reduction in power generation performance. Accordingly, in the fuel cell for use in such operation conditions, it is preferable that the water management in the membrane electrode assembly is performed so that water is discharged to the outside by improving the drainage.

Figure 2:
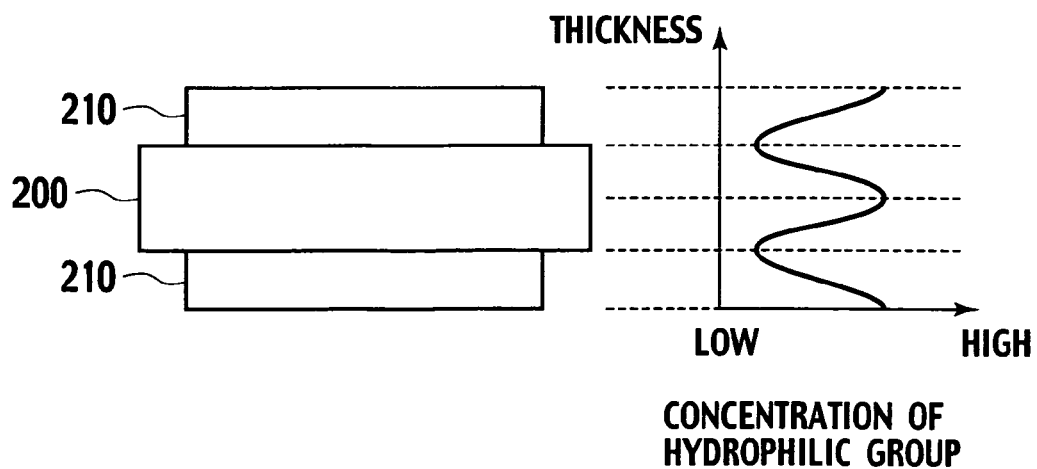
FIG. 2 is a schematic view showing a concentration gradient of the hydrophilic groups in a membrane electrode assembly of the present invention.

As the membrane electrode assembly of the present invention, a structure (II) shown in FIG. 2 is preferably used. In the structure (II), each of electrode catalyst layers 210 has a decreasing concentration gradient of the hydrophilic groups toward an electrolyte membrane 200 in the thickness direction of the electrode catalyst layer 210. The electrolyte membrane 200 has a decreasing concentration gradient of the hydrophilic groups from a center part thereof toward the surfaces in contact with the electrode catalyst layers 210 in the thickness direction. The electrolyte membrane 200 and each electrode catalyst layer 210 are attached to each other such that the surfaces with the lowest concentrations of the hydrophilic groups face each other.

In the membrane electrode assembly having the aforementioned structure (II), the center part of the electrolyte membrane is configured to have a high water retention capacity. It is therefore possible to accelerate discharge of unnecessary water tending to remain in the electrode catalyst layers while keeping the water holding capacity of the electrolyte membrane. The membrane electrode assembly can be therefore excellent in resistance to flooding and power generation performance.

In the membrane electrode assembly having the structure (II), the electrolyte membrane has a decreasing concentration gradient of the hydrophilic groups from the center part toward the surfaces in contact with the electrode catalyst layers in the thickness direction of the electrolyte membrane.

In the electrolyte membrane, the difference in water contact angle between the center part and the surfaces in contact with the electrode catalyst layers is preferably, not less than 5 degrees and more preferably, not less than 20 degrees. This can accelerate movement of water in the electrolyte membrane.

The surfaces of the electrolyte membrane provide low hydrophilicity and therefore have large water contact angles. The water contact angles of the surfaces of the electrolyte membrane are preferably 10 to 150 degrees and more preferably 60 to 130 degrees. Accordingly, water in the electrolyte membrane can move from the surfaces to the center part. It is therefore possible to prevent the polymer electrolyte from dryness even if water of the electrode catalyst layers is discharged to the outside.

The water contact angle of the center part of the electrolyte membrane is preferably 5 to 100 degrees and more preferably 5 to 60 degrees. Herein, the center part of the electrolyte membrane is a part of the electrolyte membrane other than the surfaces of the electrolyte membrane having the aforementioned water contact angles.

In the membrane electrode assembly having the structure (II), each electrode catalyst layer has such a decreasing concentration gradient of the hydrophilic groups toward the electrolyte membrane in the thickness direction of the electrode catalyst layer. Accordingly, the surfaces of the electrode catalyst layers in contact with the electrolyte membrane provide low hydrophilicity and have large water contact angles.

The water contact angles of the surfaces of the electrode catalyst layers in contact with the electrolyte membrane are preferably 10 to 150 degrees and more preferably 60 to 130 degrees. This can accelerate discharge of water tending to remain in the electrode catalyst layers to the outside.

The surface of the electrode catalyst layer opposite to the surface thereof in contact with the electrolyte membrane provides higher hydrophilicity than that of the surface thereof in contact with the electrolyte membrane. The water contact angle of the surface of the electrode catalyst layer opposite to the surface in contact with the electrolyte membrane is preferably 5 to 100 degrees and more preferably 5 to 60 degrees. This can promote discharge of unnecessary water tending to remain in the electrode catalyst layers.

In the membrane electrode assembly having the aforementioned structure (II), at the interface between each electrode catalyst layer and electrolyte membrane, the electrode catalyst layer and electrolyte membrane have an equal concentration of the hydrophilic groups and preferably have a difference in water contact angle of not more than 5 degrees. This can give an effect on not only promoting transfer of water but also improving matching of the electrode catalyst layers and electrolyte membrane.

Moreover, in a membrane electrode assembly for use in a fuel cell operating in conditions of particularly high humidity and high current density, such as in the case where the humidity of gas externally supplied is not less than 80% or where the output current density is not less than 1.0 A/cm$^2$, the drainage needs to be further improved. Accordingly, it is preferable that the membrane electrode assembly includes a structure (III) having an increasing concentration gradient of the hydrophilic groups from one of the electrode catalyst layers toward the other in the thickness direction of the membrane electrode assembly.

Figure 3:
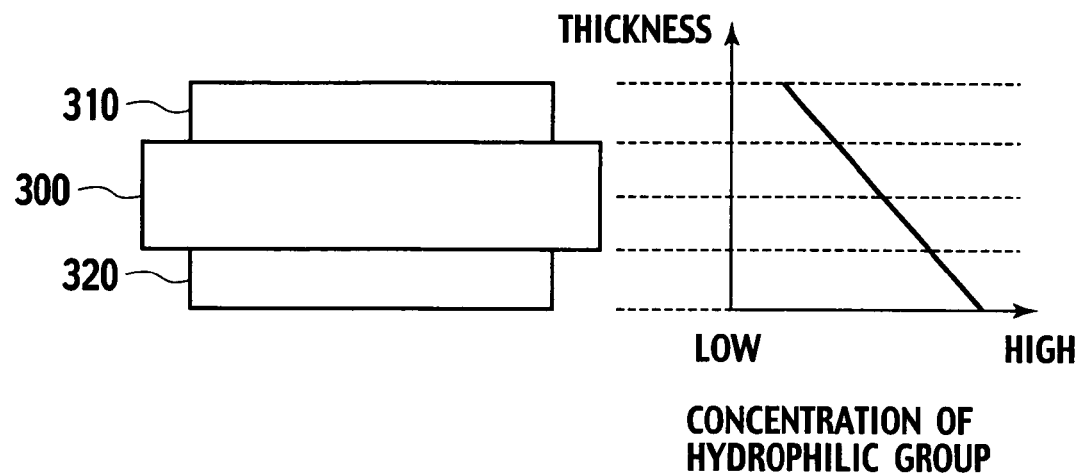
FIG. 3 is a schematic view showing a concentration gradient of the hydrophilic groups in a membrane electrode assembly of the present invention.

The specific structure of the membrane electrode assembly having the structure (III) is shown in FIG. 3. An electrode catalyst layer 310 has an increasing concentration gradient of the hydrophilic groups toward an electrolyte membrane 300 in the thickness direction of the electrode catalyst layer 310. An other electrode catalyst layer 320 has a decreasing concentration gradient of the hydrophilic groups toward the electrolyte membrane 300 in the thickness direction of the electrode catalyst layer 320. The electrolyte membrane 300 has an increasing concentration gradient of the hydrophilic groups in the thickness direction of the electrolyte membrane 300. The surface of the electrode catalyst layer 310 having higher concentration of the hydrophilic groups is attached to the surface of the electrolyte membrane 300 having lower concentration of the hydrophilic groups. The surface of the other electrode catalyst layer 320 having lower concentration of the hydrophilic groups is attached to the surface of the electrolyte membrane 300 having higher concentration of the hydrophilic groups.

In the membrane electrode assembly having the structure (III) shown in FIG. 3, preferably, the electrode catalyst layer 310 is positioned on a cathode side while the electrode catalyst layer 320 is positioned an anode side. This can give an effect on increasing water moving from the cathode to the anode to inhibit dryness of the anode.

In the membrane electrode assembly having the aforementioned structure (III), the electrolyte membrane has an increasing concentration gradient of the hydrophilic groups in the thickness direction of the electrolyte membrane. In the aforementioned electrolyte membrane, the difference in water contact angle between the surface in contact with one of the electrode catalyst layers and the surface in contact with the other electrode catalyst layer is preferably not less than 10 degrees and more preferably not less than 30 degrees. This can accelerate movement of water.

In the electrolyte membrane, one of the surfaces has high hydrophilicity, and the other surface has low hydrophilicity. In the electrolyte membrane, the water contact angle of the surface having high hydrophilicity is preferably 50 to 65 degrees and more preferably 50 to 60 degrees. This can accelerate discharge of water tending to remain in the membrane electrode assembly to the outside.

Furthermore, in the electrolyte membrane, the water contact angle of the surface having low hydrophilicity is preferably 70 to 85 degrees and more preferably 70 to 80 degrees. This can accelerate discharge of water tending to remain in the membrane electrode assembly to the outside.

In the electrode catalyst layer positioned on the surface of the electrolyte membrane having low hydrophilicity, the concentration of the hydrophilic groups increases towards the electrolyte membrane in the thickness direction. In the above electrode catalyst layer, the difference in water contact angle between the surface opposite to the surface in contact with the electrolyte membrane and the surface in contact with the electrolyte membrane is preferably not less than 5 degrees and more preferably not less than 10 degrees. This can accelerate movement of water.

In the electrode catalyst layer positioned on the surface of the electrolyte membrane having low hydrophilicity, the water contact angle of the surface in contact with the electrolyte membrane is preferably 90 to 105 degrees and more preferably 90 to 100 degrees. This can accelerate discharge of water tending to remain in the membrane electrode assembly to the outside.

In the electrode catalyst layer positioned on the surface of the electrolyte membrane having low hydrophilicity, the water contact angle of the surface opposite to the surface in contact with the electrolyte membrane is preferably 110 to 125 degrees and more preferably 110 to 120 degrees. This can accelerate discharge of water tending to remain in the membrane electrode assembly to the outside.

In the electrode catalyst layer positioned on the surface of the electrolyte membrane having high hydrophilicity, the concentration of the hydrophilic groups decreases toward the electrolyte membrane in the thickness direction. In the aforementioned electrode catalyst layer, the difference in water contact angle between the surface opposite to the surface in contact with the electrolyte membrane and the surface in contact with the electrolyte membrane is preferably not less than 5 degrees and more preferably not less than 10 degrees. This can accelerate movement of water.

In the electrode catalyst layer positioned on the surface of the electrolyte membrane having high hydrophilicity, the water contact angle of the surface in contact with the electrolyte membrane is preferably 30 to 45 degrees and more preferably 30 to 40 degrees. This can accelerate discharge of water tending to remain in the membrane electrode assembly to the outside.

In the electrode catalyst layer positioned on the surface of the electrolyte membrane having high hydrophilicity, the water contact angle of the surface opposite to the surface in contact with the electrolyte membrane is preferably 10 to 25 degrees and more preferably 10 to 20 degrees. This can accelerate discharge of water tending to remain in the membrane electrode assembly to the outside.

In the membrane electrode assembly having the structure (III), at the interface of the electrode catalyst layer and electrolyte membrane, the electrode catalyst layer and electrolyte membrane have an equal concentration of the hydrophilic groups and preferably have a difference in water contact angle of not more than 5 degrees. This can give an effect on not only accelerating movement of water but also improving matching of the electrode catalyst layer and electrolyte membrane.

Figure 4:
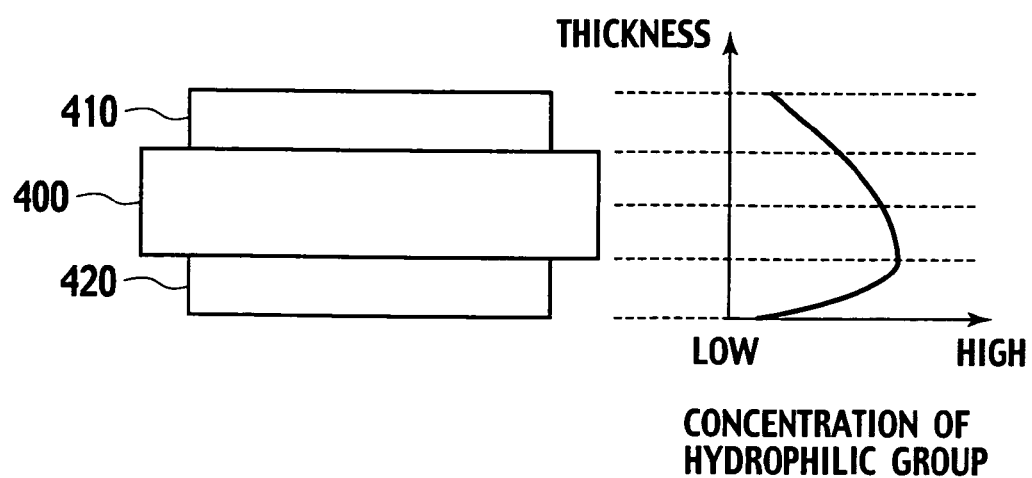
FIG. 4 is a schematic view showing a concentration gradient of the hydrophilic groups in a membrane electrode assembly of the present invention.

In the membrane electrode assembly of the present invention, it is preferable that the concentration gradient of the hydrophilic groups is controlled according to the operation conditions of the fuel cell as described above. The membrane electrode assembly of the present invention preferably has a structure (IV) as shown in FIG. 4. In the structure (IV), an electrode catalyst layer 410 and an electrolyte membrane 400 have an increasing concentration gradient of the hydrophilic groups from the electrode catalyst layer 410 toward the electrolyte membrane 400 in the thickness direction of the membrane electrode assembly. An other electrode catalyst layer 420 has an increasing concentration gradient of the hydrophilic groups toward the electrolyte membrane 400 in the thickness direction of the electrode catalyst layer 420. Furthermore, the electrolyte membrane 400 and the other electrode catalyst layer 420 are attached to each other so that the surfaces thereof having highest concentrations of the hydrophilic groups face each other.

According to the membrane electrode assembly having the structure (IV), the concentration gradient of the hydrophilic groups can be given to the entire membrane electrode assembly in the thickness direction thereof, so that it is possible to accelerate movement of water in an arbitrary direction to discharge the same to the outside.

In operation conditions of particularly low humidity and low current density, such as in the case where the humidity of gas externally supplied is not more than 10% or where the output current density is not more than 0.1 A/cm$^2$, the polymer electrolyte tends to dry in the anode side surface of the electrolyte membrane. Accordingly, in the membrane electrode assembly having the structure (IV) shown in FIG. 4, it is preferable that the electrode catalyst layers 410 and 420 are positioned on the cathode side and anode side, respectively. The anode-side surface of the electrolyte membrane can be therefore reformed by water produced by the electrode reaction in the cathode-side electrode catalyst layer, and the polymer electrolyte contained in a part which particularly tends to dry can be efficiently humidified.

In the membrane electrode assembly having the structure (IV), the electrolyte membrane has an increasing concentration gradient of the hydrophilic groups from the one of the electrode catalyst layers toward the other electrode catalyst layer in the thickness direction of the electrolyte membrane. Accordingly, in the electrolyte membrane, one of the surfaces has high hydrophilicity while the other surface has low hydrophilicity. In the electrolyte membrane, the difference in water contact angle between the surface in contact with the one electrode catalyst layer and the surface in contact with the other electrode catalyst layer is preferably not less than 5 degrees and more preferably not less than 10 degrees. This can accelerate movement of water in the electrolyte membrane.

The water contact angle of the surface of the electrolyte membrane having high hydrophilicity is preferably 30 to 65 degrees and more preferably 30 to 60 degrees. This can accelerate discharge of water tending to remain in the membrane electrode assembly to the outside.

The water contact angle of the surface of the electrolyte membrane having low hydrophilicity is preferably 70 to 85 degrees and more preferably 70 to 80 degrees. This can promote discharge of water tending to remain in the membrane electrode assembly to the outside.

In the electrode catalyst layer positioned on the surface of the electrolyte membrane having low hydrophilicity, the concentration of the hydrophilic groups increases in the thickness direction. In the above electrode catalyst layer, the difference in water contact angle between the surface opposite to the surface in contact with the electrolyte membrane and the surface in contact with the electrolyte membrane is preferably not less than 5 degrees and more preferably not less than 10 degrees. This can accelerate movement of water.

In the electrode catalyst layer positioned on the surface of the electrolyte membrane having low hydrophilicity, the water contact angle of the surface in contact with the electrolyte membrane is preferably 90 to 105 degrees and more preferably 90 to 100 degrees. This can accelerate discharge of water tending to remain in the membrane electrode assembly to the outside.

In the electrode catalyst layer positioned on the surface of the electrolyte membrane having low hydrophilicity, the water contact angle of the surface opposite to the surface in contact with the electrolyte membrane is preferably 110 to 125 degrees and more preferably 110 to 120 degrees. This can accelerate discharge of water tending to remain in the membrane electrode assembly to the outside.

In the electrode catalyst layer positioned on the surface of the electrolyte membrane having high hydrophilicity, the concentration of the hydrophilic groups decreases in the thickness direction. In the above electrode catalyst layer, the difference in water contact angle between the surface opposite to the surface in contact with the electrolyte membrane and the surface in contact with the electrolyte membrane is preferably not less than 5 degrees and more preferably not less than 10 degrees. This can accelerate movement of water.

In the electrode catalyst layer positioned on the surface of the electrolyte membrane having high hydrophilicity, the water contact angle of the surface in contact with the electrolyte membrane is preferably 30 to 65 degrees and more preferably 30 to 60 degrees. This can accelerate retention of water at the interface between the electrolyte membrane and catalyst layer in the membrane electrode assembly.

In the electrode catalyst layer positioned on the surface of the electrolyte membrane having high hydrophilicity, the water contact angle of the surface opposite to the surface in contact with the electrolyte membrane is preferably 70 to 125 degrees and more preferably 80 to 125 degrees. This can accelerate retention of water at the interface between the electrolyte membrane and electrode catalyst layer in the membrane electrode assembly.

In the membrane electrode assembly having the structure (IV), at the interface between each electrode catalyst layer and the electrolyte membrane, the electrode catalyst layer and electrolyte membrane have an equal concentration of the hydrophilic groups and preferably have a difference in water contact angle therebetween of not more than 5 degrees. This can give an effect on not only accelerating movement of water but also improving matching of the electrode catalyst layers and electrolyte membrane.

In the membrane electrode assembly of the present invention, the water contact angle of the electrode catalyst layers or electrolyte membrane can be measured by static water contact angle measurement of dropping water onto the surface of each electrode catalyst layer or the electrolyte membrane and measuring the contact angle between the surface and the water droplet.

In the membrane electrode assembly of the present invention, the electrolyte membrane and electrode catalyst layers are not particularly limited in terms of the compositions and the like other than the above-described concentration gradient of the hydrophilic groups. The compositions of the electrolyte membrane and electrode catalyst layers are described with examples below but are not limited to the followings.

The electrode catalyst layer includes an electrode catalyst with a catalyst component supported on an electroconductive support and the polymer electrolyte.

The catalyst component in the cathode catalyst layer only should have catalysis in the oxygen reduction reaction, and the catalyst component in the anode catalyst layer only should have catalysis in the hydrogen oxidation reaction. Specifically, the catalyst component is selected from metals such as platinum, ruthenium, iridium, rhodium, palladium, osmium, tungsten, lead, iron, chromium, cobalt, nickel, manganese, vanadium, molybdenum, gallium, and aluminum and alloys thereof. Among these metals, in order to improve the catalytic activity, the resistance to poisoning by carbon monoxide, the heat resistance, and the like, the substances containing at least platinum are preferably used. Preferably, the composition of the aforementioned alloy is, depending on the type of the alloyed metal, 30 to 90 atm % platinum and 10 to 70 atm % alloyed metal. In the case of using the alloy as the cathode catalyst, the composition of the alloy, which depends on the type of the alloyed metal and can be properly selected by those skilled in the art, is preferably 30 to 90 atm % platinum and the other 10 to 70 atm % alloyed metal.

Preferably, the electroconductive support of the electrode catalyst is mainly composed of carbon. Specifically, the electroconductive support is carbon particles of carbon black, activated carbon, coke, natural graphite, artificial graphite, or the like. In the present invention, "being mainly composed of carbon" means containing carbon atoms as a main component and is an idea including both "being composed of only carbon atoms" and "being substantially composed of carbon atoms". In some cases, the electroconductive support may contain an element other than carbon atoms to improve the properties of the fuel cell. The "being substantially composed of carbon atoms" means that incorporation of not more than 2 to 3 mass % impurities is allowed.

The polymer electrolyte for use in the electrode catalyst layer is not particularly limited and can be a publicly known substance but preferably has at least proton conductivity. This allows the electrode catalyst layer to have high power generation performance. The polymer electrolyte applicable in such a case is a fluorine polymer having all of or a part of a polymer skeleton fluorinated and including an ion-exchange group, a hydrocarbon polymer not including fluorine in the polymer skeleton and including an ion-exchange group, or the like. The ion-exchange group is one of the aforementioned substances.

Specifically, the fluorine polymer including the ion-exchange group includes the followings. Preferable examples thereof are perfluorocarbon sulfonic acid polymers such as Nafion (registered trademark, DuPont corporation), Aciplex (registered trademark, Asahi Kasei corporation), and Flemion (registered trademark, Asahi Glass Co., Ltd.); polytrifluorostyrene sulfonic acid polymers; perfluorocarbon phosphonic acid polymers; trifluorostyrene sulfonic acid polymers; ethylene tetrafluoroethylene-g-styrene sulfonic acid polymers; ethylene-tetrafluoroethylene copolymers; polytetrafluoroethylene-g-polystyrene sulfonic acid polymers; and polyvinylidene fluoride-g-polystyrene sulfonic acid polymers.

Specifically, the polymer electrolyte which is the hydrocarbon polymer having an ion-exchange group includes the followings. Preferable examples thereof are polysulfone sulfonic acid polymers, polyether ether ketone sulfonic acid polymers, polybenzimidazole alkylsulfonic acid polymers, polybenzimidazole alkylphosphonic acid polymers, crosslinked polystyrene sulfonic acid polymers, and polyethersulfone sulfonic acid polymers.

Polymer electrolytes have high ion exchange capability and are excellent in chemical and mechanical durability. Among these, it is preferable to use a polymer electrolyte which is a fluorine polymer having an ion-exchange group. Specifically, fluorine electrolytes such as Nafion (registered trademark, DuPont corporation), Aciplex (registered trademark, Asahi Kasei corporation), and Flemion (registered trademark, Asahi Glass Co., Ltd.) are preferred.

To obtain a desired electrolyte resistance value, the content of the polymer electrolyte contained in each electrode catalyst layer is preferably 0.15 to 0.45 mass % of the total mass of the components constituting each electrode catalyst layer and more preferably 0.25 to 0.40 mass %. When the content of the polymer electrolyte is 0.15 mass % or more, the polymer electrolyte can be uniformly held in the catalyst layer. When the content of the polymer electrolyte is 0.45 mass % or less, the reaction gas can be adequately diffused. The "total mass of the components constituting the electrode catalyst layer" is a sum of the mass of the electrode catalyst and the mass of the polymer electrolyte.

In consideration of the diffusion of the externally supplied gas and the power generation performance of the membrane electrode assembly, the thickness of each electrode catalyst layer is preferably 1 to 25 µm, more preferably 2 to 20 µm, and still more preferably 5 to 10 µm. When the thickness of the electrode catalyst layer is 1 µm or more, the electrode catalyst layer can be easily formed so as to have uniform thicknesses in the in-plane and thickness directions. When the thickness of the electrode catalyst layer is 25 µm or less, it is possible to prevent flooding caused by water remaining in the electrode catalyst layer. Herein, the thickness of the electrode catalyst layer is a value measured from observation results of a transmission electron microscope.

The electrolyte membrane for use in the membrane electrode assembly of the present invention is a membrane composed of a polymer electrolyte having proton conductivity. As the polymer electrolyte, the materials described in the electrode catalyst layer can be used.

The thickness of the electrolyte membrane, which should be properly determined in consideration of the properties of the obtained membrane electrode assembly, is preferably 5 to 300 µm, more preferably 10 to 200 µm, and still more preferably 15 to 100 µm. The thickness is preferably 5 µm or more in the light of strength during membrane formation and durability in operation, and the thickness is preferably 300 µm or less in the light of the output characteristics at the operation of the fuel cell.

The electrolyte membrane for use in the membrane electrode assembly of the present invention preferably has a membrane obtained by forming a membrane on a hydrophilic or hydrophobic substrate using a polymer electrolyte solution. The membrane having a concentration gradient of the hydrophilic groups can be formed without increasing the manufacturing steps and cost.

The polymer electrolyte solution is a solution containing the polymer electrolyte and is obtained by dissolving the polymer electrolyte in a solvent.

The solvent for use in the polymer electrolyte solution is a substance, not particularly limited, which can dissolve the polymer electrolyte and can be removed thereafter. Specifically, preferable examples thereof are: dipolar aprotic solvents such as N,N-dimethylformamide, N,N-dimethylacetamide, N-methyl-2-pyrrolidone, and dimethyl sulfoxide; chlorinated solvents such as dichloromethane, chloroform, 1,2-dichloroethane, chlorobenzene, and dichlorobenzene; alcohols such as methanol, ethanol, propanol, and isopropyl alcohol; alkylene glycol monoalkyl ethers such as ethylene glycol monomethyl ether, ethylene glycol monoethyl ether, propylene glycol monomethyl ether, and propylene glycol monoethyl ether. These can be used singly or in combination of two or more types if necessary.

Formation of a membrane on a predetermined substrate with the polymer electrolyte solution uses a method of applying the polymer electrolyte solution on a hydrophilic or hydrophobic substrate and then drying the same. Applying the polymer electrolyte solution on the hydrophilic or hydrophobic substrate allows the hydrophilic groups to be segregated in the thickness direction. For example, in the case of using the hydrophilic substrate, the hydrophilic groups can be segregated on the substrate side. In the case of using a hydrophobic substrate, a highly hydrophobic substance is segregated on the substrate side, and the hydrophilic groups can be segregated to the side opposite to the substrate.

The hydrophobic substrate is a substrate in which at least the surface to which the polymer electrolyte solution is applied is hydrophobic. The water contact angle of the surface of the substrate to which the polymer electrolyte solution is applied is preferably not less than 90 degrees and more preferably not less than 110 degrees.

Specifically, examples of the hydrophobic substrate are substrates made of fluorine resin such as polytetrafluoroethylene (PTFE), polyvinylidene fluoride (PVDF), polyhexafluoropropylene, and tetrafluoroethylene-hexafluoropropylene copolymer (FEP); and substrates made of urethane resin, polystyrene resin, epoxy resin, acrylic resin, vinyl ester resin, maleic acid resin, urea resin, melamine resin, and norbornene resin. The substrate may be a substrate, such as a glass plate, a PET (polyethylene terephthalate) film, a stainless plate, a stainless belt, a silicon wafer, or the like, with a coating of the above fluorine resin on the surface, and in addition, may be a substrate with the surface physically treated such as a substrate with the surface roughened by sandpaper. Moreover, the substrate may be a substrate with the surface chemically treated by organic silane treatment by CVD, liquid-phase adsorption, surface graft polymerization, or the like.

The hydrophilic substrate indicates a substrate in which at least a surface to which the polymer electrolyte solution is applied is hydrophilic. The water contact angle of the surface of the substrate to which the polymer electrolyte solution is applied is preferably not more than 90 degrees and more preferably not more than 60 degrees.

The hydrophilic substrate is a substrate such as a glass plate, a PET film, a stainless plate, a stainless belt, a silicon wafer, or the like, with the hydrophilic functional groups introduced to the surface by oxidation or the like. Moreover, the substrate may be a substrate with at least the surface reformed to be hydrophilic by a chemical treatment such as organic silane CVD treatment, liquid-phase adsorption, surface graft polymerization, or the like.

The aforementioned oxidation is a liquid-phase method by strongly-oxidizing aqueous solution containing potassium permanganate, nitric acid, chlorate salts, persulfate salts, perborate salts, percarbonate salts, hydrogen peroxide, piranha solution, or the like; a gas-phase method by oxygen gas, water vapor, or the like; plasma irradiation; a pyrogenic method (hydrogen combustion) using water vapor produced by a reaction of hydrogen and oxygen; a gas-phase method by ozone, nitrogen oxide, air, or the like; or the like. The above piranha solution is obtained by heating a solution mixture of hydrogen peroxide solution with a concentration of 31% and concentrated sulfuric acid (volume ratio 3/7) to 70 to 130° C.

The hydrophilic functional group is preferably a hydroxyl group, a carboxyl group, a phenol group, a ketone group, a carbonyl group, a quinone group, a cyano group, or the like.

In addition to the aforementioned substrates, the hydrophilic substrate includes a substrate such as a glass plate, a PET film, a stainless plate, a stainless belt, a silicon wafer, or the like, with a coating of a hydrophilic organic material on the surface. Moreover, the hydrophilic substrate includes a substrate with at least the surfaces reformed to be hydrophilic by a physical treatment such as roughing the surface by sandpaper or the like.

The hydrophilic organic material is preferably polyvinyl alcohol, polyacrylic acid, polyacrylonitrile, polyvinylsulfone, polyurethane, or polyethylene oxide. Especially in terms of attachment and bonding to the material, a fluorine-contained hydrophilic polymer is advantageous. Such a fluorine-contained hydrophilic polymer is obtained by copolymerization of a fluorine-contained ethylene unsaturated monomer and a hydrophilic group-contained vinyl monomer not including fluorine. Such a fluorine-contained monomer is tetrafluoroethylene, vinyl fluoride, vinylidene fluoride, monochlorotrifluoroethylene, dichlorodifluoroethylene, hexafluoropropylene, or the like.

The method of applying the polymer electrolyte solution on the hydrophobic or hydrophilic substrate can be curtain coating, extrusion coating, roll coating, spin coating, dip coating, bar coating, spray coating, slide coating, print coating, or the like.

By applying the polymer electrolyte solution on the hydrophobic or hydrophilic substrate, the membrane having a concentration gradient of the hydrophilic groups in the thickness direction can be obtained. The membrane obtained by such a method can be directly used as the electrolyte membrane in the membrane electrode assemblies shown in FIGS. 3 and 4.

Moreover, the electrolyte membrane having a concentration gradient of the hydrophilic groups from the center part towards the both surfaces, like the electrolyte membranes used in the membrane electrode assemblies shown in FIGS. 1 and 2, are obtained by attaching the membranes obtained by the aforementioned method to each other so that the surfaces having high hydrophilicity or the surfaces having high hydrophobicity face to each other. Each of the membranes obtained by the aforementioned method can be directly used as the electrolyte membrane. However, it is also possible to stack two or more of the membranes obtained by the aforementioned method for use as the electrolyte membrane so that a desired concentration gradient of the hydrophilic groups is obtained.

Next, the electrode catalyst layer for use in the membrane electrode assembly of the present invention is preferably obtained by forming a membrane on the hydrophilic or hydrophobic substrate using the electrode catalyst layer solution. The electrode catalyst layer manufactured in such a manner can have a concentration gradient of the hydrophilic groups without an increase in manufacturing steps and cost.

The electrode catalyst layer is manufactured by the same method as the aforementioned manufacturing method of the electrolyte membrane except that the electrode catalyst layer solution is used instead of the polymer electrolyte solution.

The electrode catalyst layer solution contains at least the electrode catalyst, the polymer electrolyte, and a solvent. The electrode catalyst and polymer electrolyte are as described above.

The solvent is not particularly limited but is water and/or an alcohol solvent such as methanol, ethanol, 1-propanol (NPA), 2-propanol, ethylene glycol, or propylene glycol.

The membrane electrode assembly of the present invention may include a gas diffusion layer on the surface of each electrode catalyst layer opposite to the surface in contact with the electrolyte membrane. The gas externally supplied can be therefore uniformly diffused and supplied to the electrode catalyst layers.

The gas diffusion layer is composed of a sheet-shaped conductive and porous gas-diffusion base material such as carbon fabric, paper material, and nonwoven fabric or the like.

The thickness of the gas-diffusion base material should be properly determined in consideration of the properties of the intended gas diffusion layer and should be about 30 to 500 μm. When the thickness is less than 30 μm, the gas diffusion layer may not have adequate mechanical strength, and when the thickness thereof is more than 500 μm, gas, water, and the like diffuse the long distance, which is undesirable.

It is preferable that the gas-diffusion base material contains a water repellant for the purpose of further increasing the water repellency to prevent flooding and the like. The water repellant, which is not particularly limited, is a fluorine polymer such as polytetrafluoroethylene (PTFE), polyvinylidene fluoride (PVDF), polyhexafluoropropylene, or tetrafluoroethylene-hexafluoropropylene copolymer (FEP), polypropylene, polyethylene, or the like.

To further increase the water repellency, the gas diffusion layer may include a carbon particle layer on the gas-diffusion base material, the carbon particle layer being composed of an aggregate of carbon particles containing a water repellant.

The carbon particles, which is not particularly limited, are carbon black, graphite, expanded graphite, or the like. The water repellant for use in the carbon particle layer is the same as the aforementioned repellant for use in the gas diffusion layers. The fluorine polymer is preferably used because of excellent water repellency, resistance to corrosion at the electrode reaction, and the like.

In terms of the mixture ratio of the carbon particles to the water repellant in the carbon particle layer, when the carbon particles are too much, expected repellency cannot be obtained, and when the water repellant is too much, adequate electron conductivity cannot be obtained. The mixture ratio of the carbon particles to the water repellant in the carbon particle layer should be about 90/10 to 40/60 by mass.

The thickness of the carbon particle layer should be properly determined in consideration of the repellency of the intended gas diffusion layer and is preferably 10 to 200 μm and more preferably 20 to 100 μm.

In the aforementioned membrane electrode assembly of the present invention, the water management is controlled in the entire membrane electrode assembly, and it is therefore possible to obtain a fuel cell having a high power generation performance. Especially by controlling the water management in the membrane electrode assembly according to the operation conditions of the fuel cell, the power generation performance of the fuel cell can be further increased.

The type of the fuel cell is not particularly limited, and the above explanation is given with the polymer electrolyte fuel cell as an example. Other examples of the fuel cell include an alkali fuel cell, acid type electrolyte fuel cells typified by a phosphate fuel cell, direct methanol fuel cells, and micro fuel cells. Especially the polymer electrolyte fuel cell is preferred because the polymer electrolyte fuel cell is small and can have higher density and output.

The structure of the fuel cell is not particularly limited and is generally a structure in which the MEA is sandwiched by separators.

Each of the separators can be made of: carbon such as dense carbon graphite or a carbon plate; metal such as stainless; an inorganic material such as ceramic, glass, or silicon; an organic material such as epoxy resin, polyimide resin, or polyethylene terephthalate (PET); an organic-inorganic composite material such as glass fiber reinforced epoxy resin. The thickness and size of each separator and the shape of the gas passage are not particularly limited and should be properly determined in consideration of the output characteristics of the intended fuel cell. The separator can be a unit of a cathode-side separator and an anode-side separator integrated.

Furthermore, in order to obtain a desired voltage and the like from the fuel cell, a plurality of MEAs may be stacked with the separators interposed therebetween and are connected in series to form a stack. At stacking the fuel cells, it is possible to properly arrange a cooling water passage to control the operating temperature of the fuel cells. The shape of the fuel cell is not particularly limited and should be properly determined so as to obtain battery characteristics including desired voltage.

Hereinafter, the present invention is described more concretely using examples. The present invention is not limited to only the following examples.

The water contact angle was measured by the following method of: dropping a droplet with a pipette onto the substrate, electrolyte membrane, or electrode catalyst layer; and 30 seconds later, measuring the contact angle using a contact angle meter (CAX-150, Kyowa interface science, Co., Ltd.).

EXAMPLE 1

1. Preparation of Hydrophilically Treated Substrate (A)

Hydrogen peroxide solution with a concentration of 31 wt % and concentrated sulfuric acid were mixed in a volume ratio of 3/7 and heated to 80° C. to prepare a piranha solution. A glass substrate was immersed in the obtained piranha solution for 12 hours to obtain a hydrophilically treated substrate (A).

2. Preparation of Hydrophilically Treated Substrate (B)

A hydrophilically treated substrate (B) was obtained in a similar way to that of the hydrophilically treated substrate (A) except that the glass substrate was immersed in the piranha solution for six hours.

3. Preparation of Hydrophilically Treated Substrate (C)

A hydrophilically treated substrate (C) was obtained in a similar way to that of the hydrophilically treated substrate (A) except that the glass substrate was immersed in the piranha solution for an hour.

4. Preparation of Electrolyte Membrane

As the polymer electrolyte solution, Nafion solution (registered trademark of DuPont, DE520, content of Nafion 5 wt %) was used. The Nafion solution was applied to the prepared hydrophilically treated substrate (B) and was left in the atmosphere at 25° C. for 24 hours to remove the solvent. The membrane obtained on the hydrophilically treated substrate (B) is peeled off with tweezers to prepare an electrolyte membrane (10 cm×10 cm in area, 50 μm thick). Table 1 shows water contact angles of the hydrophilic surface of the electrolyte membrane which was in contact with the hydrophilically treated substrate and the surface of the electrolyte membrane opposite to the hydrophilic surface.

5. Preparation of Cathode-Side Electrode Catalyst Layer

The raw materials were 10 g of platinum supported carbon (TEC10E50E, platinum content 46.5%, Tanaka Kikinzoku Kogyo K. K.), 4.5 g of Nafion (registered trademark)/isopropyl alcohol solution (Nafion content 5 wt %, DuPont corporation), 50 g of pure water, 40 g of 1-propanol (special grade chemical, Wako Pure Chemical Industries, Ltd.), and 40 g of 2-propanol (special grade chemical, Wako Pure Chemical Industries, Ltd.). These materials were mixed and distributed in a glass vessel within a water bath set to keep the materials at 25° C. for three hours using a homogenizer, thus preparing the electrode catalyst layer solution. The obtained electrode catalyst layer solution was applied to the hydrophilically treated substrate (C) and left in the atmosphere at 25° C. for 24 hours to remove the solvent. The membrane obtained on the hydrophilically treated substrate (C) was peeled off with tweezers to prepare a cathode-side electrode catalyst layer (20 μm thick, 5 cm×5 cm in area). Table 1 shows water contact angles of the hydrophilic surface of the cathode-side electrode catalyst layer which was in contact with the hydrophilically treated substrate and the surface of the electrolyte membrane opposite to the hydrophilic surface.

6. Preparation of Anode-Side Electrode Catalyst Layer

The anode-side electrode catalyst layer was prepared in a similar way to the preparation of the aforementioned cathode-side electrode catalyst layer except that the hydrophilically treated substrate (A) was used instead of the hydrophilically treated substrate (C). Table 1 shows water contact angles of the hydrophilic surface of the anode-side electrode catalyst layer which was in contact with the hydrophilically treated substrate and the surface of the electrolyte membrane opposite to the hydrophilic surface.

7. Assembly of Membrane Electrode Assembly

The above prepared electrolyte membrane, cathode-side electrode catalyst layer, and anode-side electrode catalyst layer were assembled into the membrane electrode assembly. At this time, the hydrophilic surface of the cathode-side electrode catalyst layer which was in contact with the hydrophilically treated substrate and the surface of the electrolyte membrane opposite to the hydrophilic surface thereof which was in contact with the hydrophilically treated substrate were attached to each other. Further, the surface of the anode-side electrode catalyst layer opposite to the hydrophilic surface which was in contact with the hydrophilically treated substrate and the surface of the electrolyte membrane which was in contact with the hydrophilically treated substrate were attached to each other.

TABLE 1

|  |  | Contact Angle (deg.) |
|---|---|---|
| Anode-side electrode catalyst layer | Hydrophilic Surface | 63.2 |
|  | Opposite Surface | 96.7 |
| Electrolyte membrane | Hydrophilic Surface | 96.4 |
|  | Opposite Surface | 100.2 |
| Cathode-side electrode catalyst layer | Hydrophilic Surface | 101.9 |
|  | Opposite Surface | 130.2 |

COMPARATIVE EXAMPLE

An electrolyte membrane was prepared by the method described in the paragraph "4. Preparation of Electrolyte membrane" of the aforementioned Example 1 except that a glass substrate which was used in the above Example 1 and not hydrophilically treated was used instead of the hydrophilically treated substrate (B).

The water contact angles of the surface of the electrolyte membrane which was in contact with the glass substrate and the surface thereof opposite to the surface which was in contact with the glass substrate measured 101.6 and 97.2 degrees, respectively.

Cathode-side and anode-side electrode catalyst layers were prepared by the method described in the paragraph "5. Preparation of Cathode-side electrode catalyst layer" of the aforementioned Example 1 except that a glass substrate which was the same as that of the above Example 1 but not hydrophilically treated was used instead of the hydrophilically treated substrate (C). The water contact angles of the surface of each electrode catalyst layer which was in contact with the glass substrate and the surface thereof opposite to the surface which was in contact with the glass substrate measured 96.8 and 95.8 degrees, respectively.

The cathode-side electrode catalyst layer, electrolyte membrane, and anode-side electrode catalyst layer were stacked in this order so that the surfaces of the electrolyte membrane face the respective surfaces of the electrode catalyst layers having smallest contact angles. Subsequently, the obtained stack was hot pressed in the stacking direction. The hot pressing conditions were 130° C., 2.5 MPa, and 600 seconds. Eventually, gas diffusion layers (carbon paper, 1300 μm thick) were provided on the both surfaces of the stack, thus completing a membrane electrode assembly of this comparative example.

EXAMPLE 2

A membrane electrode assembly of the mode shown in FIG. 1 was prepared by the following method.

First, two electrolyte membrane were prepared by the method described in the paragraph "4. Preparation of Electrolyte membrane" of the above Example 1. Next, the prepared two electrolyte membranes were attached to each other with the hydrophobic surfaces, which were opposite to the surfaces in contact with the substrates, facing to each other, thus preparing the electrolyte membrane 100.

The cathode-side and anode-side electrode catalyst layers 110 were individually prepared by the method described in the paragraph "5. Preparation of Cathode-side electrode catalyst layer" of the above Example 1 except that the hydrophilically treated substrate (B) obtained in the above Example 1 was used instead of the hydrophilically treated substrate (C).

The cathode-side electrode catalyst layer 110, electrolyte membrane 100, and anode-side electrode catalyst layer 110 were stacked in this order so that the surfaces (hydrophilic surfaces) of the electrolyte membrane 100 face the respective hydrophilic surfaces of the electrode catalyst layers 110. Subsequently, the obtained stack was hot pressed in the stacking direction. The hot pressing conditions were 130° C., 2.5 MPa, and 600 seconds. Eventually, gas diffusion layers (carbon paper, 300 μm thick) were provided on the both surfaces of the stack, thus completing a membrane electrode assembly shown in FIG. 1.

Figure 5:
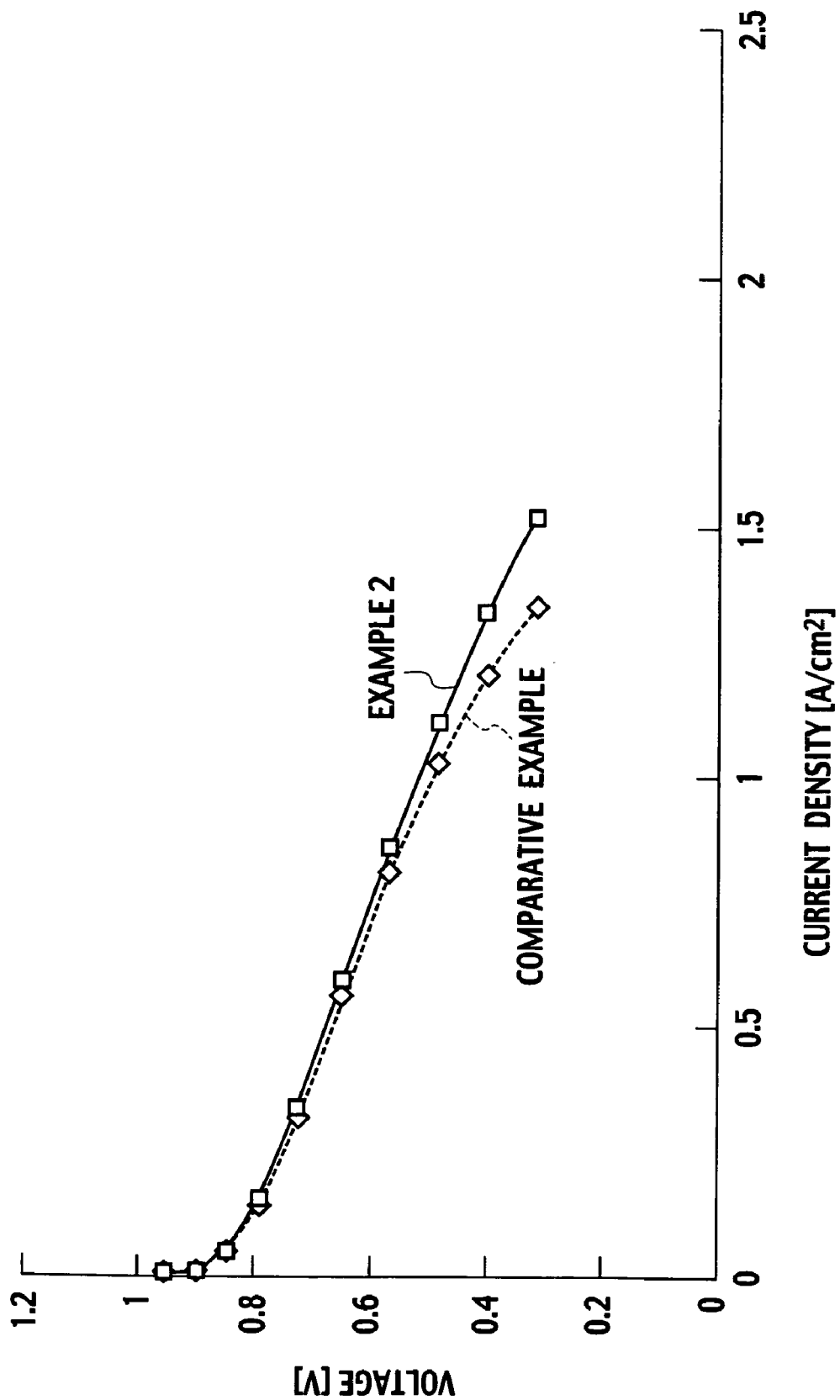
FIG. 5 is a diagram showing results of power generation experiments performed using membrane electrode assemblies of Example 2 and Comparative Example.

For the purpose of evaluating the effect of preventing dryness in the anode-side electrode catalyst layer in dry conditions, a power generation test was performed using the membrane electrode assemblies obtained in Example 2 and Comparative Example. The power generation conditions at this time were cell temperature: 80° C., supplied gas (anode side): pure hydrogen, supplied gas (cathode side): air, gas supply pressure: 50 kPa, supplied gas humidity (anode side): 30% RH, and supplied gas humidity (cathode side): 30% RH. The results of the power generation test are shown in FIG. 5.

EXAMPLE 3

The membrane electrode assembly of the mode shown in FIG. 2 was prepared by the following method.

First, two electrolyte membranes were prepared by the method described in the paragraph "4. Preparation of Electrolyte membrane" of the above Example 1. Next, the prepared two electrolyte membranes were attached to each other with the hydrophilic surfaces, which were in contact with the hydrophilically treated substrates, facing to each other, thus preparing the electrolyte membrane 200.

The cathode-side and anode-side electrode catalyst layers 210 were individually prepared by the same method as that of the above Example 2.

The cathode-side electrode catalyst layer 210, electrolyte membrane 200, and anode-side electrode catalyst layer 210 were stacked in this order so that the surfaces (hydrophobic surfaces) of the electrolyte membrane 200 face the respective hydrophobic surfaces of the electrode catalyst layers 210. Subsequently, the obtained stack was hot pressed in the stacking direction. The hot pressing conditions were 130° C., 2.5 MPa, and 600 seconds. Eventually, gas diffusion layers (carbon paper, 300 μm thick) were provided on the both surfaces of the stack, thus completing the membrane electrode assembly shown in FIG. 2.

Figure 6:
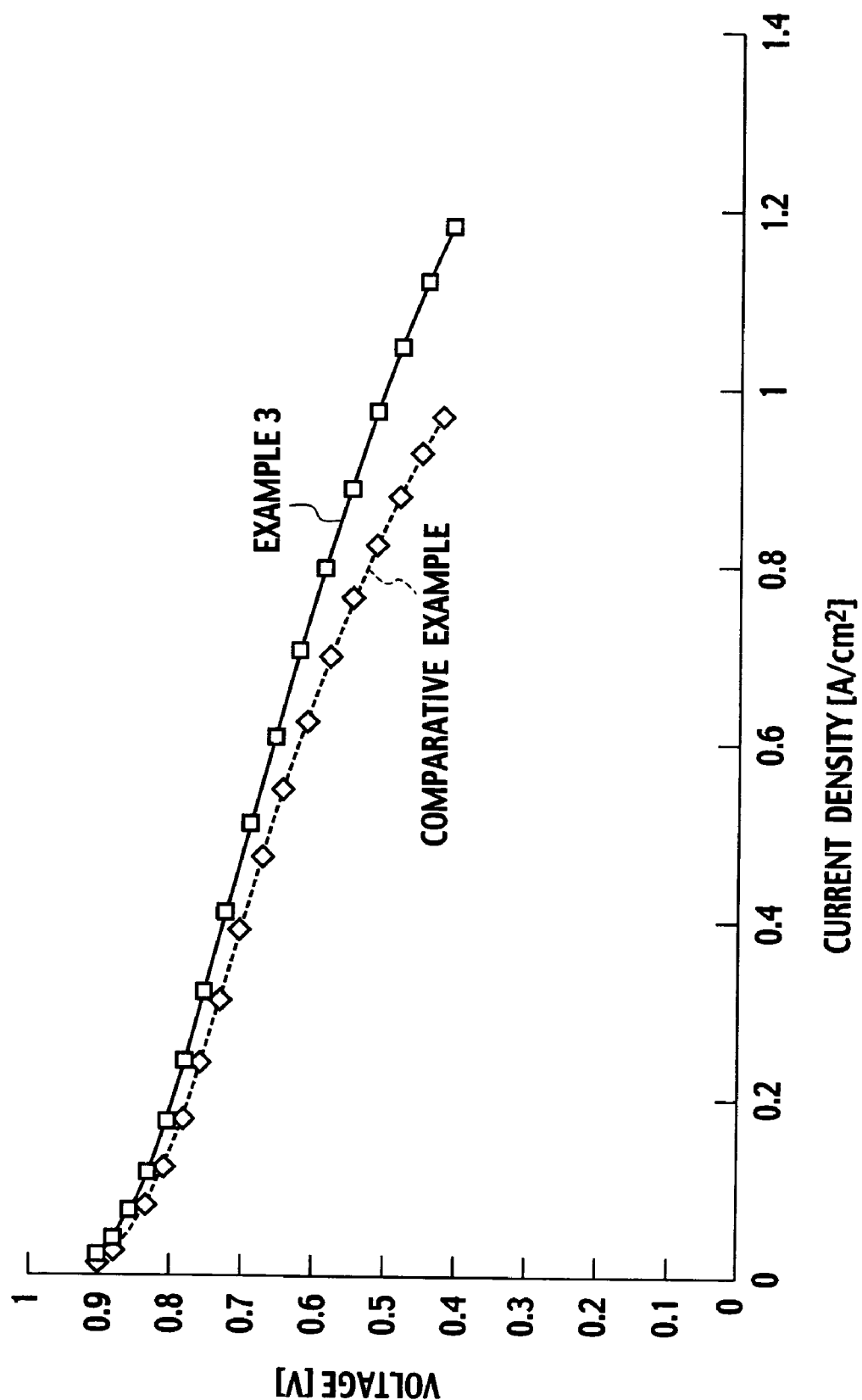
FIG. 6 is a diagram showing results of power generation experiments performed using membrane electrode assemblies of Example 3 and Comparative Example.

For the purpose of evaluating the resistance to flooding in wet conditions, a power generation test was performed using the membrane electrode assemblies obtained in Example 3 and Comparative Example. The power generation conditions at this time were cell temperature: 70° C., supplied gas (anode side): pure hydrogen, supplied gas (cathode side): air, gas supply pressure: 100 kPa, supplied gas humidity (anode side): 100% RH, and supplied gas humidity (cathode side): 100% RH. The results of the power generation test are shown in FIG. 6.

EXAMPLE 4

The membrane electrode assembly of the mode shown in FIG. 3 was prepared by the following method.

First, the electrolyte membrane 300 was prepared by the method described in the paragraph "4. Preparation of Electrolyte membrane" of the above Example 1.

The cathode-side electrode catalyst layer 310 was prepared by the method described in the paragraph "5. Preparation of Cathode-side electrode catalyst layer" of the above Example 1.

The anode-side electrode catalyst layer 320 was prepared by the method described in the paragraph "5. Preparation of Cathode-side electrode catalyst layer" of the above Example 1 except that the hydrophilically treated substrate (A) obtained in the aforementioned Example 1 was used instead of the hydrophilically treated substrate (C).

The cathode-side electrode catalyst layer 310, electrolyte membrane 300, and anode-side electrode catalyst layer 320 were stacked in this order so that the hydrophobic surface of the electrolyte membrane 300 faces the hydrophilic surface of the electrode catalyst layer 310 and the hydrophilic surface of the electrolyte membrane 300 faces the hydrophobic surface of the electrode catalyst layer 320. Subsequently, the obtained stack was hot pressed in the stacking direction. The hot pressing conditions were 130° C., 2.5 MPa, and 600 seconds. Eventually, gas diffusion layers (carbon paper, 300 μm thick) were provided on the both surfaces of the stack, thus completing the membrane electrode assembly shown in FIG. 3.

Figure 7:
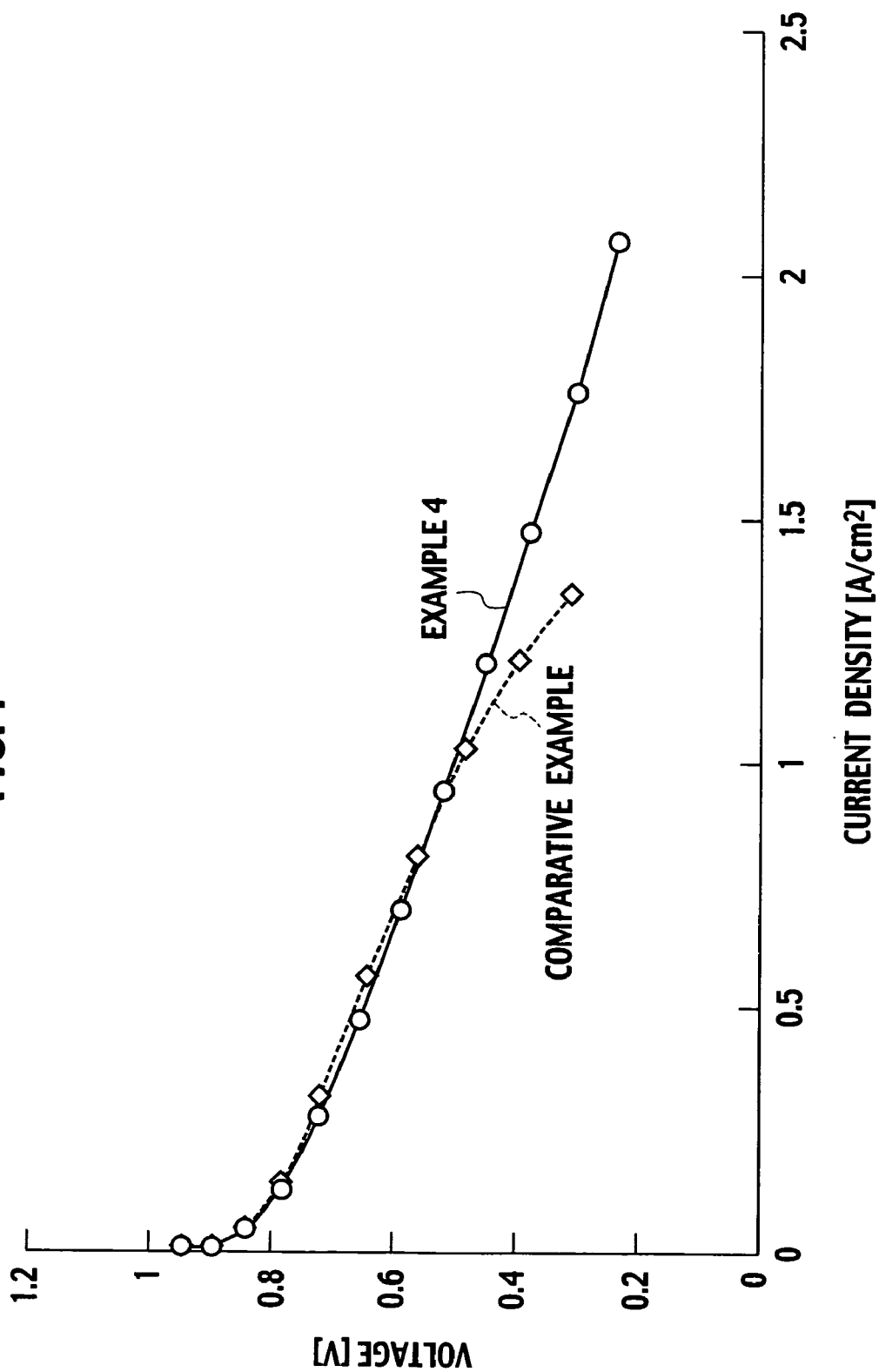
FIG. 7 is a diagram showing results of power generation experiments performed using membrane electrode assemblies of Example 4 and Comparative Example.

For the purpose of evaluating the effect of preventing dryness in the anode-side electrode catalyst layer in dry conditions, a power generation test was performed using the membrane electrode assemblies obtained in Example 4 and Comparative Example. The power generation conditions at this time were cell temperature: 80° C., supplied gas (anode side): pure hydrogen, supplied gas (cathode side): air, gas supply pressure: 50 kPa, supplied gas humidity (anode side): 30% RH, and supplied gas humidity (cathode side): 30% RH. The results of the power generation test are shown in FIG. 7.

EXAMPLE 5

The membrane electrode assembly of the mode shown in FIG. 4 was prepared by the following method.

First, the electrolyte membrane 400 was prepared by the method described in the paragraph "4. Preparation of Electrolyte membrane" of the above Example 1.

The cathode-side electrode catalyst layer 410 was prepared by the method described in the paragraph "5. Preparation of Cathode-side electrode catalyst layer" of the above Example 1.

The anode-side electrode catalyst layer 420 was prepared by the method described in the paragraph "5. Preparation of Cathode-side electrode catalyst layer" of the above Example 1 except that the hydrophilically treated substrate (A) obtained in the aforementioned Example 1 was used instead of the hydrophilically treated substrate (C).

The cathode-side electrode catalyst layer 410, electrolyte membrane 400, and anode-side electrode catalyst layer 420 were stacked in this order so that the hydrophobic surface of the electrolyte membrane 400 faces the hydrophilic surface of the electrode catalyst layer 410 and the hydrophilic surface of the electrolyte membrane 400 faces the hydrophilic surface of the electrode catalyst layer 420. Subsequently, the obtained stack was hot pressed in the stacking direction. The hot pressing conditions were 130° C., 2.5 MPa, and 600 seconds. Eventually, gas diffusion layers (carbon paper, 300 μm thick) were provided on the both surfaces of the stack, thus completing the membrane electrode assembly shown in FIG. 4.

Figure 8:
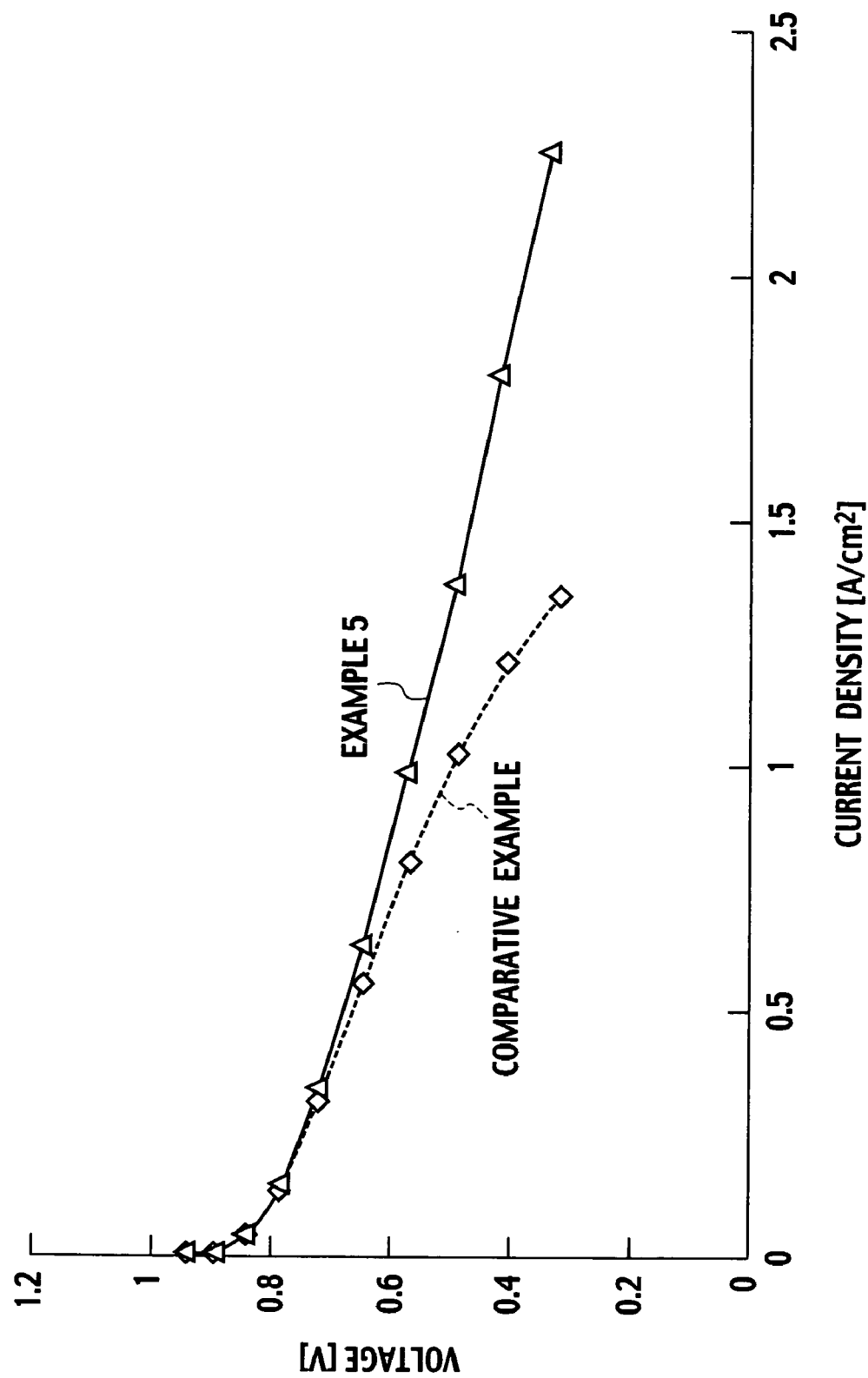
FIG. 8 is a diagram showing results of power generation experiments performed using membrane electrode assemblies of Example 5 and Comparative Example.

For the purpose of evaluating the effect of preventing dryness in the anode-side electrode catalyst layer in dry conditions, a power generation test was performed using the membrane electrode assemblies obtained in Example 5 and Comparative Example. The power generation conditions at this time were cell temperature: 80° C., supplied gas (anode side): pure hydrogen, supplied gas (cathode side): air, gas supply pressure: 50 kPa, supplied gas humidity (anode side): 30% RH, and supplied gas humidity (cathode side): 30% RH. The results of the power generation test are shown in FIG. 8.

(Results)

As shown in FIGS. 5 to 8, the membrane electrode assemblies of the present invention obtained in Examples 2 to 5 exhibited excellent power generation performance compared to the membrane electrode assembly of Comparative Example. This is thought to be because of the following mechanism. However, the technical scope of the present invention is not limited by the following mechanism.

In the membrane electrode assembly of Example 2, by the concentration gradient of the hydrophilic groups as shown in FIG. 1, water produced in the cathode-side electrode catalyst layer is less likely to diffuse toward the gas diffusion layer. It is therefore thought that inverse diffusion of the produced water toward the anode side is accelerated to prevent dryness in the anode-side electrode catalyst layer.

In the membrane electrode assembly of Example 4, by the concentration gradient of the hydrophilic groups as shown in FIG. 3, water produced in the cathode-side electrode catalyst layer is more likely to diffuse toward the anode-side. It is therefore thought that inverse diffusion of the produced water toward the anode side is promoted to prevent dryness in the anode-side electrode catalyst layer.

In the membrane electrode assembly of Example 5, by the concentration gradient of the hydrophilic groups as shown in FIG. 4, water produced in the cathode-side electrode catalyst layer is more likely to diffuse toward the anode-side, and water produced in the anode-side electrode catalyst layer is less likely to diffuse toward the gas diffusion layer. It is therefore considered that the operational effects obtained in Examples 2 and 4 can be integrally obtained to further prevent the dryness in the anode-side electrode catalyst layer and secure good wet conditions.

In the membrane electrode assembly of Example 3, it is thought that produced water easily diffuses from the interface between the electrolyte membrane and electrode catalyst layers toward both the electrolyte membrane side and gas diffusion layer side to prevent performance reduction due to flooding. From the above results, according to the present invention, it is possible to provide a membrane electrode assembly with water management performed in the entire membrane electrode assembly in the thickness direction according to the operation conditions of the fuel cell including the same.

The entire contents of Japanese Patent Applications No. 2005-376426 (filed on Dec. 27, 2005) and No. 2006-236454 (filed on Aug. 31, 2006) are incorporated herein.

Hereinabove the contents of the present invention are described along the embodiments and examples. However, the present invention is not limited to these descriptions, and it is obvious to those skilled in the art that various modifications and changes can be made.

INDUSTRIAL APPLICABILITY

According to the present invention, it is possible to provide a membrane electrode assembly with water management in the thickness direction carried out throughout the entire membrane electrode assembly according to the operation conditions of a fuel cell including the same.

The invention claimed is:

1. A membrane electrode assembly for a fuel cell, comprising:
an electrolyte membrane; and
a pair of electrode catalyst layers provided on both surfaces of the electrolyte membrane,
wherein, in a thickness direction of the electrolyte membrane and the electrode catalyst layers, a plurality of hydrophilic groups exist along a substantially continuous concentration gradient from a surface of one of the electrode catalyst layers opposite to the surface thereof in contact with the electrolyte membrane to a surface of the other electrode catalyst layer opposite to the surface thereof in contact with the electrolyte membrane.

2. The membrane electrode assembly according to claim 1, wherein the plurality of hydrophilic groups are ion-exchange groups in a polymer electrolyte contained in the electrolyte membrane and electrode catalyst layer.

3. The membrane electrode assembly according to claim 2, wherein the ion-exchange groups are at least one type selected from the group consisting of —$SO_3H$, —OH, —$PO_4^{3-}$, —COOH, —$PO(OH)_2$, —POH(OH), —$SO_2NHSO_2$—, -Ph(OH) (Ph indicates a phenyl group), —$NH_2$, —NHR, —NRR', —NRR'R''$^+$, and —$NH_3^+$ (R, R', R'' are an alkyl group, a cycloalkyl group, and an aryl group).

4. The membrane electrode assembly according to claim 1, wherein each of the electrode catalyst layers includes an increasing concentration gradient of the hydrophilic groups toward the electrolyte membrane in the thickness direction of the electrode catalyst layer,
the electrolyte membrane includes an increasing concentration gradient of the hydrophilic groups from a center part thereof toward the surfaces in contact with the electrode catalyst layers in the thickness direction of the electrolyte membrane, and
the surfaces of the electrolyte membrane and electrode catalyst layers having highest concentrations of the hydrophilic groups are attached to each other.

5. The membrane electrode assembly according to claim 1, wherein each of the electrode catalyst layers includes a decreasing concentration gradient of the hydrophilic groups toward the electrolyte membrane in the thickness direction of the electrode catalyst layer,
the electrolyte membrane includes a decreasing concentration gradient of the hydrophilic groups from a center part thereof toward the surfaces in contact with the electrode catalyst layers in the thickness direction of the electrolyte membrane, and
the surfaces of the electrolyte membrane and electrode catalyst layers having lowest concentrations of the hydrophilic groups are attached to each other.

6. The membrane electrode assembly according to claim 1, wherein the plurality of hydrophilic groups exist along an increasing concentration gradient from one of the electrode catalyst layers toward the other electrode catalyst layer in the thickness direction of the membrane electrode assembly.

7. The membrane electrode assembly according to claim 1, wherein one of the electrode catalyst layers and the electrolyte membrane include an increasing concentration gradient of the hydrophilic groups from the one electrode catalyst layer toward the electrolyte membrane in the thickness direction of the membrane electrode assembly,
the other electrode catalyst layer includes an increasing concentration gradient of the hydrophilic groups toward the electrolyte membrane in the thickness direction of the electrode catalyst layer, and
the surfaces of the electrolyte membrane and the other electrode catalyst layer having highest concentrations of the hydrophilic groups are attached to each other.

8. The membrane electrode assembly according to claim 1, wherein the electrolyte membrane includes a membrane obtained by performing membrane formation using a polymer electrolyte solution on a hydrophilic or hydrophobic substrate.

9. The membrane electrode assembly according to claim 1, wherein each of the electrode catalyst layers is obtained by performing membrane formation using an electrode catalyst layer solution on a hydrophilic or hydrophobic substrate.

10. A fuel cell comprising:
a membrane electrode assembly according to claim 1.

* * * * *